United States Patent
Kim et al.

(10) Patent No.: US 7,263,101 B2
(45) Date of Patent: Aug. 28, 2007

(54) HOST DIGITAL TERMINAL

(75) Inventors: Yong-Hoe Kim, Anyang (KR);
Seung-Ki Jang, Youngin (KR)

(73) Assignee: Samsung Electronics Co., Ltd.,
Suwon-si, Gyeonggi-do (KR)

( * ) Notice: Subject to any disclaimer, the term of this patent is extended or adjusted under 35 U.S.C. 154(b) by 1091 days.

(21) Appl. No.: 10/214,316

(22) Filed: Aug. 8, 2002

(65) Prior Publication Data
US 2003/0099245 A1 May 29, 2003

(30) Foreign Application Priority Data
Nov. 29, 2001 (KR) .............................. 2001-75074

(51) Int. Cl.
*H04L 12/28* (2006.01)

(52) U.S. Cl. .................... 370/395.64; 370/230
(58) Field of Classification Search ............ 370/395.64
See application file for complete search history.

(56) References Cited

U.S. PATENT DOCUMENTS

| | | | |
|---|---|---|---|
| 5,935,209 A * | 8/1999 | Budhraja et al. ............ 709/223 |
| 6,097,721 A * | 8/2000 | Goody ........................ 370/379 |
| 6,229,788 B1 * | 5/2001 | Graves et al. ............... 370/230 |
| 7,088,704 B1 * | 8/2006 | Byers et al. ................. 370/352 |
| 2001/0055322 A1 * | 12/2001 | Domon ........................ 370/537 |
| 2002/0163921 A1 * | 11/2002 | Ethridge et al. ............. 370/401 |
| 2003/0192053 A1 * | 10/2003 | Sheppard et al. ............. 725/81 |

* cited by examiner

*Primary Examiner*—Seema S. Rao
*Assistant Examiner*—Kevin Mew
(74) *Attorney, Agent, or Firm*—Robert E. Bushnell, Esq.

(57) ABSTRACT

A host digital terminal HDT performs backbone functions to a subscriber access network, while the network side of the HDT is connected to many data transfer networks and the other side of the HDT is connected to many optical network units ONUs. The HDT performs mutual interactions to many units by the ATM cell switching or by the STM cross connections, while the units perform predetermined functions, such as ANIU, HNIU, HIU, and HTIU. Therefore, the HDT overcomes capacity limits according to mutual interactions among the units through the conventional common bus.

16 Claims, 10 Drawing Sheets

HOST DIGITAL TERMINAL

CLAIM OF PRIORITY

This application makes reference to, incorporates the same herein, and claims all benefits accruing under 35 U.S.C. §119 from my application entitled HOST DIGITAL TERMINAL EQUIPMENT earlier filed in the Korean Industrial Property Office on Nov. 29, 2001 and there duly assigned Ser. No. 2001-75074.

BACKGROUND OF THE INVENTION

1. Field of the Invention

The present invention relates to a host digital terminal HDT, and more particularly, to a host digital terminal capable of transmitting large amounts of data, switching many units among the units to make the units mutually interact, wherein each one of the units performs a predetermined function respectively.

2. Description of the Related Art

Recently, according to a variety of the class and explosive increases of the demands of data communication services, subscribers accustomed to the data transmission of low and middle speeds, such as voice data transmission, have become to request a wide area network WAN capable of providing a high-speed digital data transmission service, such as multimedia data transmissions.

Therefore, many technologies are developed to provide such a high speed digital data service. Two standards capable of providing a high-speed digital data transmission service among the developed technologies are a fiber to the curb FTTC technology and a fiber to the home FTTH technology.

The FTTC technology is applied when optical fiber cables are installed from the public network to the front door of each home of the subscribers. In this case, the curbs are located in each of the densely inhabited districts of the subscribers respectively, and optical transmissions are performed through the optical fiber cables from a switching apparatus in the public network to the curbs. Moreover, data is transmitted through conventional telephone lines from the curb to each of the corresponding subscribers.

On the other hand, the FTTH technology sets the curb in each home of the subscribers, respectively.

A Fiber Loop Carrier FLC system connects a subscriber access network to a token-ring or a star topology, so that the subscriber access network embody such as FTTC or FTTH technology efficiently.

Figure 1:
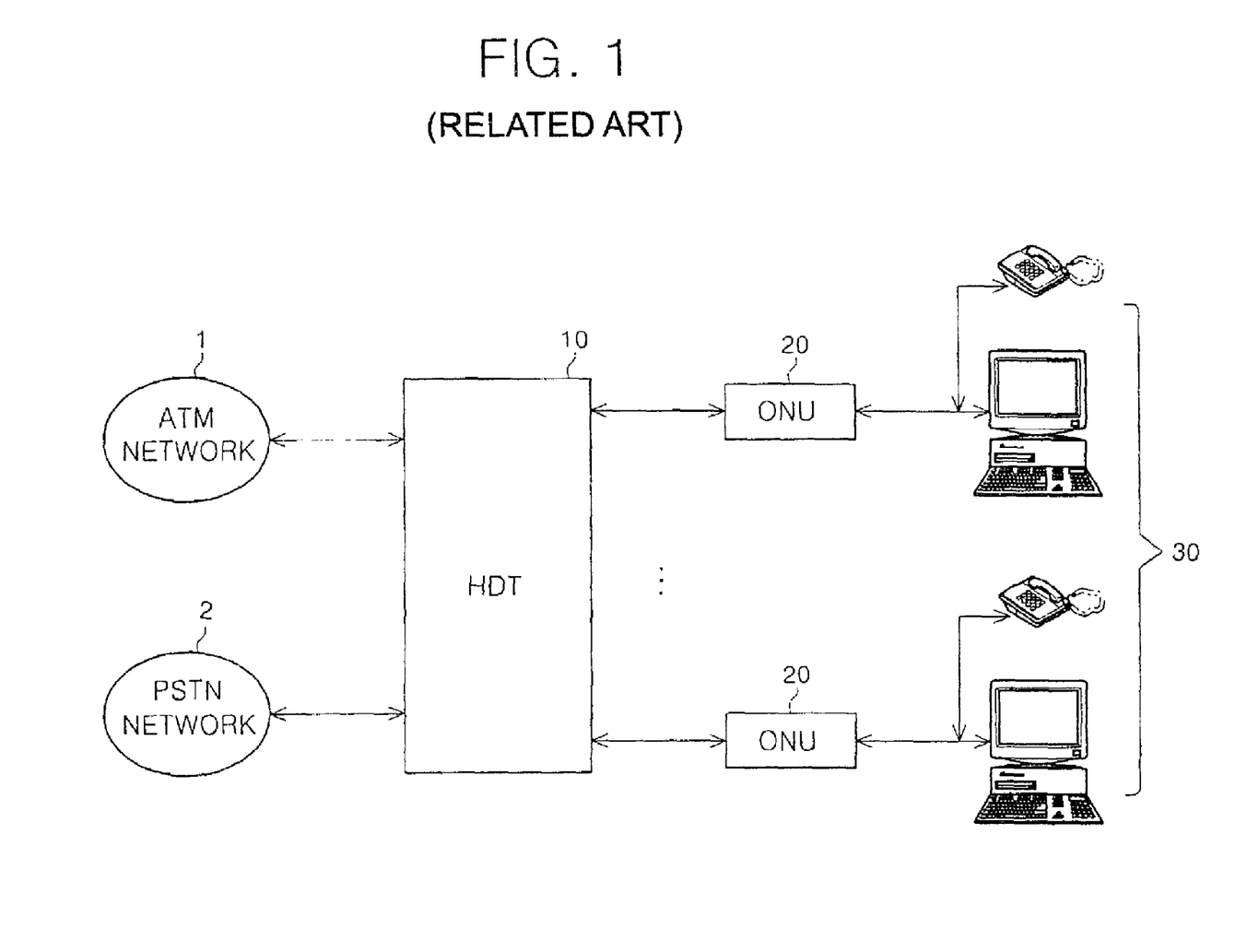
FIG. 1 is a schematic drawing illustrating a network configuration according to the conventional fiber loop carrier FLC system.

FIG. 1 is a schematic network configuration illustrating such a conventional FLC system.

The conventional FLC system, as shown in FIG. 1, includes a host digital terminal HDT 10 and many optical network units ONU 20. The HDT 10 is installed within a Central Office CO (not shown) that is a control manager of the subscriber access network. Further, many of the ONUs 20 connected to the HDT 10 in a star topology are installed within each of the subscribers, such as the curbs in each home and company.

In this case, the HDT 10, connected to a public switched telephone network PSTN 2 and an asynchronous transfer mode ATM 1 through optical fiber cables, transmits a normal telephone data, an internet data, and an interactive video data from the PSTN 2 or the ATM 1 to each of the ONUs 20 through optical fiber cables. Moreover, the HDT 10 inversely transmits those data from each of the ONUs 20 to the PSTN 2 or the ATM 1.

Each of the ONUs 20 makes the optical data signal transmitted from the HDT 10 to be inverse-multiplexed to provide a high-speed asynchronous transfer channel, having a transmission speed upward of 16~24 Kbps (kilobits per second) and downward transmission speed of 1.5~6 Mbps or 2~8 Mbps (megabits per second) in the case of E1 (European digital line interface), for each of the subscribers 30. In this case, each of the ONUs 20 utilizes twisted pair transmission lines for transmitting those data to each of the subscribers 30.

As described in the above statements, the HDT 10 has a role of backbone networks to the subscriber access network for connecting the PSTN 2 and the ATM 1 to the ONU 20.

Figure 2:
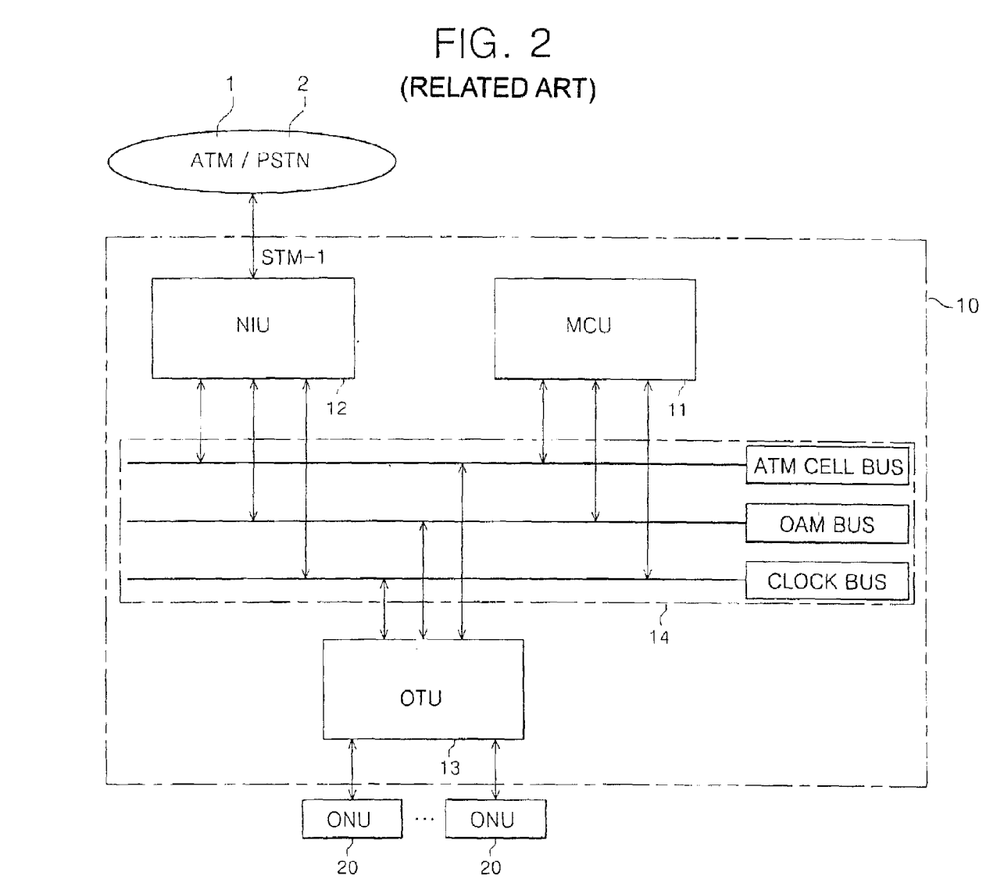
FIG. 2 is a block diagram illustrating a configuration of the conventional host digital terminal HDT.

As shown in FIG. 2, the conventional HDT 10 includes a network interface unit NIU 12, an optical transfer unit OTU 13, a main control unit MCU 11, and a common bus 14 within a shelf.

The NIU 12 interfaces with the ATM and PSTN 1 and 2, and many of the OTUs 13 interface with the corresponding ONUs 20. Additionally, the MCU 11 controls all of the data flows, such as mutual interactions among those units or operations and maintenance for ATM cells, while all of those units are mutually interacted through a common bus 14.

Further, two NIUs 12 are installed in a shelf Each of the NIUs 12, including 4 ports of a synchronous transfer module level 1 STM-1, receives 4 STM-1 signals having a transfer rate of 155.52 Mbps in each signal from the ATM 1, and translates the overhead included in the STM-1, or vice versa. Sequentially, after extracting data of the ATM cells, the NIU 12 sends the extracted ATM data to the common bus 14, or vice versa.

On the other hand, 8 OTUs 13 are installed in a shelf, and an OTU 13 is connected to two ONUs 20. Therefore, the HDT 10 equips 16 ONUs 20.

The OTU 13 receives the ATM cell data transmitted from the common bus 14, and converts the received ATM data to an optical signal of synchronous transfer module level 4 STM-4 having a transfer rate of 622.08 Mbps to transmit the ATM data to the corresponding ONU 20, or vice versa.

In summary, the conventional HDT 10, includes the NIU 12 having 4 STM-1 ports, for sending STM-1 signals to the ATM and PSTN 1 and 2 and for receiving the STM-1 signals from the ATM and PSTN 1 and 2, and 8 OTUs 13, wherein each of the OTUs 13 can connect to 2 ONUs 20. Additionally, the NTU 12 and the OTUs 13 interact with each other through the common bus 14.

However, the conventional HDT 10 has some difficulties in receiving additional requirements of the subscribers for a high speed data service, such as WAN or a multimedia based service, and exponential increases of the subscribers First of all, sending and receiving the ATM cell data among the units 11~13 in the conventional HDT 10, as shown in FIG. 2, are performed through the common bus 14. Therefore, the above described problems set limits in treating data traffics, and make it difficult to allow large transmissions of the data.

For example, when lots of ports in each of the units 11~13 simultaneously request data transmissions of the ATM cells to the common bus 14, redundant data of the ATM cells are all mixed up to make the data collided mutually. To overcome the above mentioned problems, the common bus 14 having a large capacity can be applied. However, it is not efficient in view of an economic aspect, etc.

Therefore, an interactive service based on multimedia data of large capacity, such as a video conference, a video medical examination and treatment, and a video on demand VoD, is hardly provided to the many subscribers.

Secondly, it is difficult to establish an economic system expandable to accept additional subscribers due to the lack of capacity.

Furthermore, when a star topology is applied for embodying the FTTH easily by expanding many of the star nodes, such as an ATM passive optical network PON, or many ONUs 20 are applied for connecting many subscribers expansively, it is required that there be a backbone network for supporting the topology and lots of ONU 20 perfectly. However, the conventional HDT 10 hardly satisfies such requirements.

SUMMARY OF THE INVENTION

It is therefore, an object of the present invention to provide a host digital terminal to overcome limits of the mutual interaction structures through the common bus.

It is another object to provide a host digital terminal that develops a backbone structure of a subscriber access network having better expandability to the network and more flexibility in a structure.

It is still another object to provide a host digital terminal that embodies a subscriber access network for performing large amounts of data transmissions such as a wide area network, provide various services based on large amounts of data, such as multimedia data, and increase the number of connected subscribers.

In order to achieve the above and other objects, the preferred embodiments of the present invention provide a host digital terminal HDT for performing backbone functions to a subscriber access network, while the network side of the HDT is connected to lots of data transfer network and the other side of the HDT is connected to lots of optical network units ONUs. The HDT includes: a HDT switching/clock unit HSCU for outputting an asynchronous transfer mode ATM signal, after an asynchronous transfer mode ATM serial signal is converted to an ATM parallel signal, an ATM switching is performed according to transmission information of the ATM parallel signal, and the ATM parallel signal is re-converted to the ATM serial signal, and for outputting a synchronous transfer mode STM signal, after the STM dependent signal is received, and a virtual channel VC cross connection is performed; an ATM network interface unit ANIU, connected to the data transfer network, for receiving a signal transmitted from the data transfer network, extracting an ATM signal form the transmitted signal, performing an inverse-multiplexing and each of the ANIU cell processes to the extracted ATM signal, converting the extracted ATM signal to the ATM serial signal, and transmitting the ATM serial signal to the HSCU, sequentially; a HDT network interface unit HNIU, connected to lots of ONUs, for converting the ATM serial signal transmitted from the HSCU to the ATM parallel signal, performing a multiplexing and each of HDT cell processes to the ATM parallel signal, transmitting the ATM parallel signal to the connected ONUs, sequentially; a HDT main control unit HMCU for performing control management functions for controlling mutual interactions among the units of the HDT and data flows; and a shelf for including a common bus to exchange all of the data among the units, wherein each of the units is plugged in.

Preferably, the ANIU interfaces with the data transfer network through at least one of E1/T1, DS3, STM-1, STM-4, or STM-16.

Preferably, the data transfer network is an ATM network interacted with at least one of a public switched telephone network PSTN, a voice over internet protocol service network VoIP, or an Internet protocol service network IP.

Preferably, the HNIU interfaces with lots of ONUs through at least one of STM-1, STM-4 or STM-16.

Preferably, a topology connected to the ONU is a star topology, such as an ATM passive optical network PON.

Preferably, the shelf includes 21 slots, while two HMCUs and two HSCUs are installed for duplication functions, and the other units are installed in variables according to the service conditions.

Preferably, the common bus includes: an operation, administration and maintenance OAM data bus for exchanging an OAM data; a clock bus for transmitting a clock impression signal; a virtual channel VC bus for exchanging a VC signal; and a synchronous transfer mode STM bus for exchanging an STM signal.

Preferably, the HSCU includes: a parallel/serial converter HSCU PSC for converting the transmitted ATM serial signal to an ATM parallel signal, or vice versa; an ATM switching unit HSCU SU, a switching fabric, for switching the ATM signal converted by the HSCU PSC according to the transmission information of the ATM signal, and for transmitting inversely the ATM signal to the HSCU PSC; a bus interface unit HSCU BIU for receiving a STM dependent signal from the VC bus and the STM bus, for performing a bus interface, or vice versa; and an STM cross connecter STM CC for performing a cross connection to the STM dependent signal transmitted from the HSCU BIU among one of the VC-11, VC-12, VC-3 or VC-4 class, and for transmitting inversely the STM signal to the HSCU BIU.

Preferably, the ANIU includes an optical transmitter ANIU OT, including lots of ports connected to the data transfer network through optical fiber cables, for receiving a signal from the data transfer network to perform an optical/electronic interface, or vice versa; a user network interface UNI for receiving the optical/electronic interfaced signal from the ANIU OT to perform an ATM interface to extract an ATM signal, or vice versa; a cell processor ANIU CP for performing an inverse multiplexing to the extracted ATM signal to do each kind of ATM cell processes, or vice versa; and a parallel/serial converter ANIU PSC for converting the cell processed ATM signal to an ATM serial signal transmittable to the HSCU, or vice versa.

Preferably, the HNIU includes: a parallel/serial converter HNIU PSC for converting the ATM serial signal transmitted from the HSCU to an ATM parallel signal, or vice versa; a cell processor HNIU CP for performing multiplexing and each kind of cell processes to the ATM parallel signal transmitted from the HNIU PSC; a universal network interface HNIU UNI for re-converting the ATM signal from the HNIU CP to a signal transmittable to the data transfer network, or vice versa; and an optical transmitter HNIU OT, connected to lots of ONUs through optical fiber cables, for performing an optical/electronic interface to the signal from the HNIU UNI to be transmitted to the ONU, or vice versa.

Preferably, the HDT further includes an HDT tributary interface unit HTIU for performing: an over head and pointer processes to an STM-1 signal transmitted from the data transfer network, and the STM-1 signal transmission to the common bus, or vice versa; and a line interface, and an over head and pointer process to a signal, such as E1, T1, or DS3, transmitted from the data transfer network, and the signal transmission to the common bus through multiplexing in an administration unit 3 AU3, or vice versa.

Preferably, the HDT dependent interface unit HTIU includes: an optical transmitter HTIU OT for receiving an STM-1 signal transmitted from the data transfer network to perform optical/electronic interface, or vice versa; an STM processor for performing an over head and a pointer process to the interfaced signal from the HTIU OT, or vice versa; an STM mapping unit STM MAU for converting the processed signal from the STM processor to an STM-1 signal to be transmitted to the common bus, or vice versa; a line interface unit HTIU LIU for receiving at least one signal among E1, T1, and DS3, or vice versa; a signal processor HTIU SP for performing an over head and a pointer process to the interfaced signal at HTIU LIU, or vice versa; and an AU3 multiplexing unit AU3 MPU for multiplexing the processed signal in the signal processor to an AU3 signal to be transmitted to the common bus, or vice versa.

Preferably, the HDT further includes: a hybrid interface unit HIU, connected to lots of ONUs, for transmitting the ATM signal from the HSCU and the STM signal from the common bus to the ONU.

Preferably, the hybrid interface unit HIU includes: a parallel/serial converter HIU PSC for converting the ATM serial signal transmitted from the HSCU to an ATM parallel signal, or vice versa; a cell processor HIU CP for performing a multiplexing and cell processes to the ATM signal converted by the HIU PSC, or vice versa; a bus interface unit HIU BIU for performing a bus interface to an STM signal transmitted from the common bus, or vice versa; an ATM/ STM user network interface ATM/STM UNI for interfacing the ATM signal processed by the HIU CP and the STM signal through the HIU BIU, or vice versa; and an optical transmitter HIU OT for performing optical/electronic interface to the signal interfaced by the ATM/STM UNI, so that the signal can be transmitted to the data transfer network, or vice versa.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Reference will now be made in detail to preferred embodiments of the present invention, examples of which is illustrated in the accompanying drawings. Additionally, in this application, some technical terminology is utilized for clarity and simplicity in explanations for the preferred embodiment of the present invention shown in the accompanying drawings. However, the technical terminology involves all technical synonyms that mean a similar operating method for achieving similar purposes.

Figure 3:
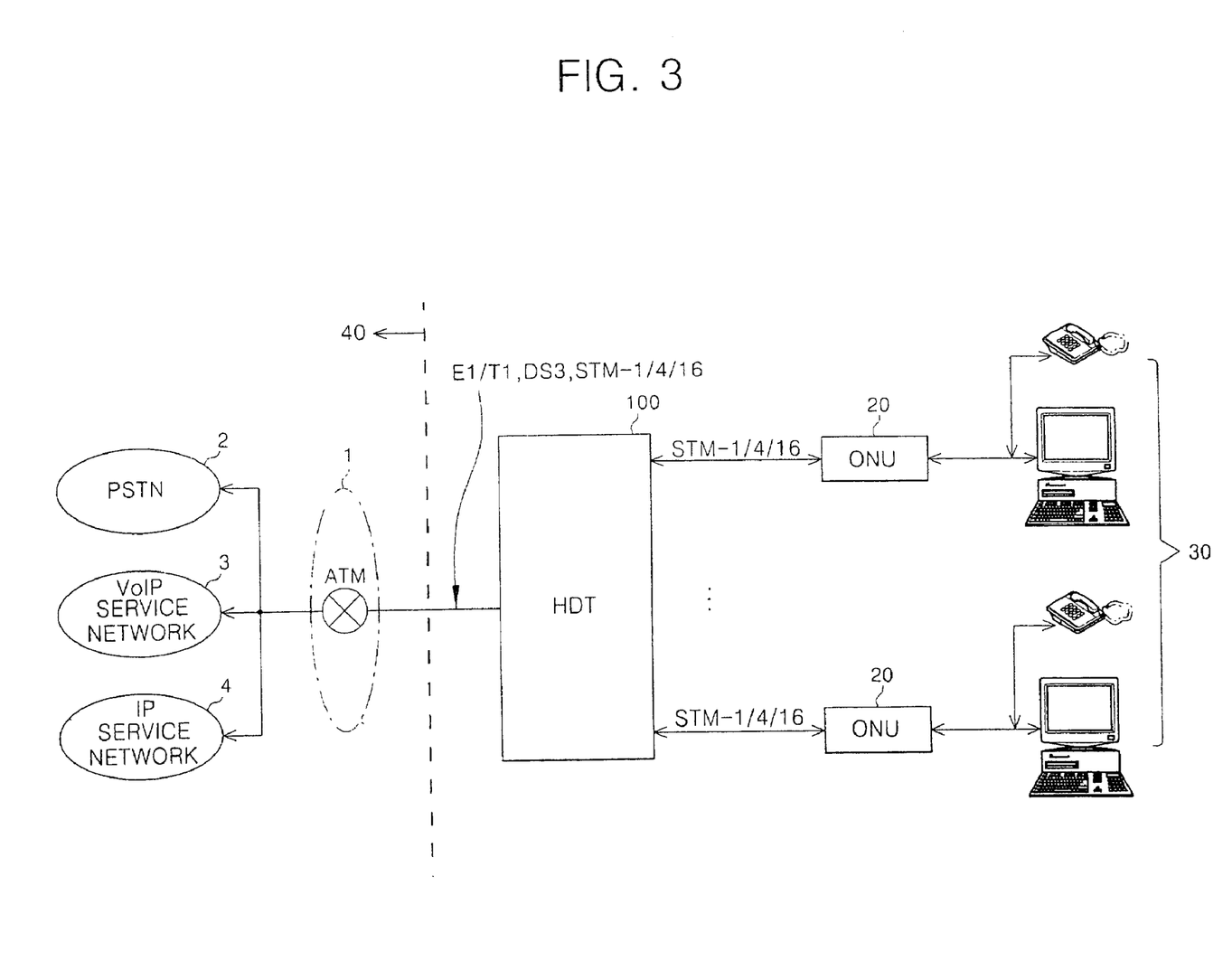
FIG. 3 is a schematic diagram illustrating a high-speed data service system, such as a wide area network WAN, embodying an HDT according to the preferred embodiment of the present invention.

FIG. 3 is a schematic diagram of a subscriber access network in a high-speed data service system, such as a WAN, wherein a host digital terminal HDT is applied according to a preferred embodiment of the present invention.

As shown in FIG. 3, the subscriber access network includes an asynchronous transfer mode ATM network 1, an HDT 100 and lots of optical network units ONUs 20. The ATM network is connected to a public switched telephone network PSTN 2, a voice over internet protocol VoIP service network 3, and an Internet protocol IP service network 4. The HDT 100 has a role of a backbone network, where one side of the HDT 100 interfaces with an ATM network 1 through E1/T1, DS3 or STM-1/-4/-16, and the other side of the HDT 100 interfaces with many ONUs 20 through STM-1/-4/-16. In this case, the E1 is one of E-carrier systems and the T1 is one of T-carrier systems, while DS3 is one of digital signals x and each of STM-1/-4/-16 is respectively one of synchronous transfer mode signals.

The ONU 20 receives the STM-1/-4/-16 signals from the HDT 100 through optical fiber cables, performs inversemultiplex operations based on the ATM, and transmits the STM-1/-4/-16 signals to lots of subscribers 30 through telecommunication lines, or vice versa.

The preferable topology between the HDT 100 and the ONU 20 is a star topology, such as the ATM passive optical network PON, as shown in FIG. 3.

Figure 4:
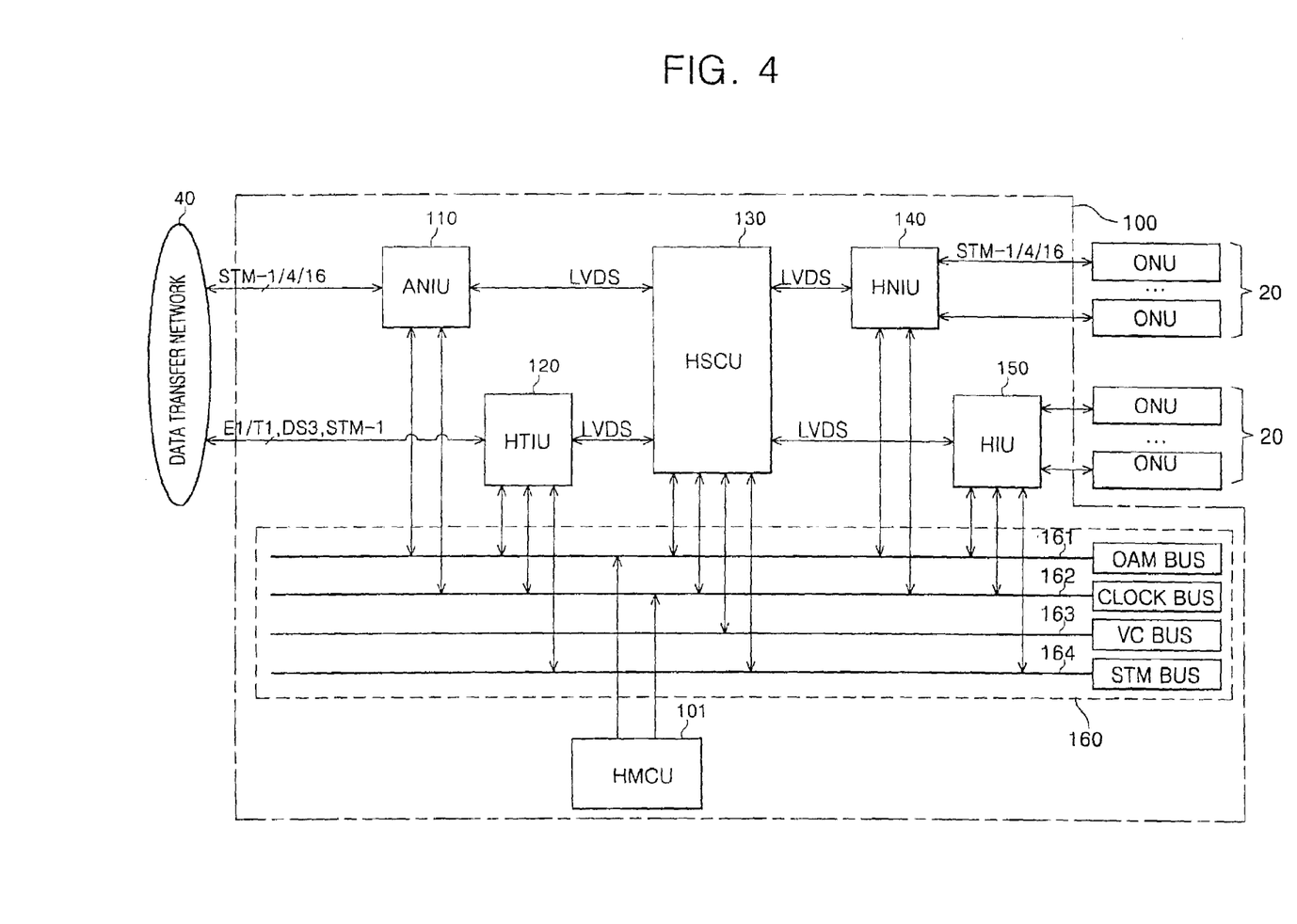
FIG. 4 is a block diagram illustrating a configuration of the HDT in FIG. 3.

FIG. 4 is a block diagram illustrating a configuration of the HDT according to the preferred embodiment of the present invention.

Figure 5:
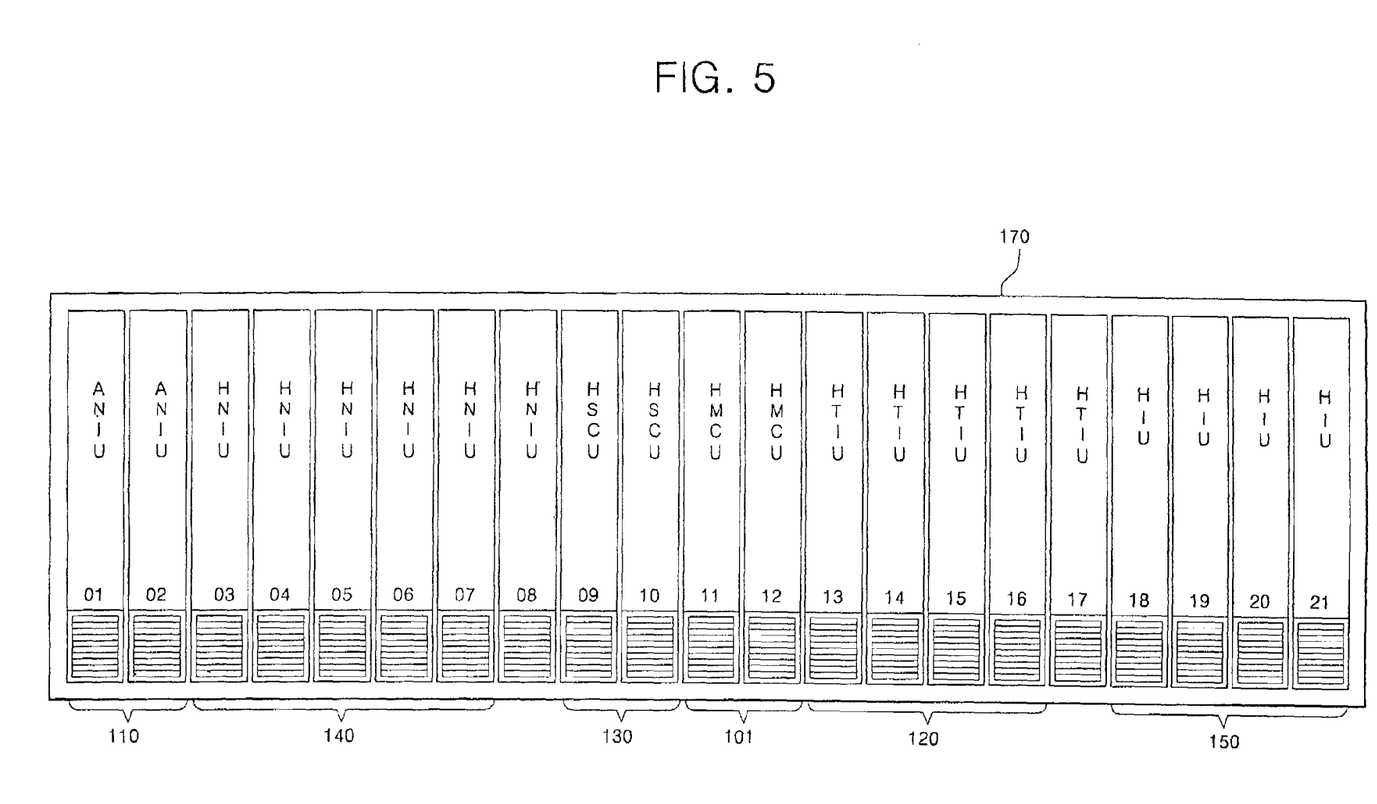
FIG. 5 is a plain view illustrating the shelf equipping units in FIG. 4.

As shown in FIG. 4, the HDT 100 of the present invention includes many units 101~150 for performing predetermined functions respectively in a shelf 170. In other words, the HDT 100 includes many ATM network interface units ANIUs 110, an HDT switching/clock unit HSCU 130, a hybrid interface unit HIU 150, an HDT tributary interface unit HTIU 120, a HDT master control unit HMCU 101 and a shelf 170. In this case, the HMCU 101 controls data flows and mutual interactions among the above described units 101~150, and the above described units 101~150 are plugged in the shelf 170 as shown in FIG. 5. The data transmissions of the ATM cells among the units 101~150 are accomplished by switching operations of the HSCU 130.

The shelf 170 includes 21 slots and the width of the shelf is 23 inches. As shown in FIG. 5, two HMCUs 101 and two HSCUs 130 are installed for duplication functions, and two ANIUs 110 are installed in the shelf 170. The HNIU 140, the HIU 150, and the HTIU 120 are installed in the remaining slots, but the number of the units 120, 140 and 150 installed in the shelf 170 can be varied according to situations of the network and of service requirements.

Preferably, the shelf 170 internally installs a common bus 160 including an OAM bus 161 for operation, administration and maintenance, a clock bus 162 for clock impression, a VC bus 163 for virtual channel transmissions, and an STM bus 164 for STM signal transmissions. Therefore, the common bus 160 performs each of the functions necessary to mutual interactions of the installed units 101~150.

In the following statements, structures and interaction operations for the above described, each of the units are explained in more details by referring to FIG. 6 to FIG. 9.

Figure 6:
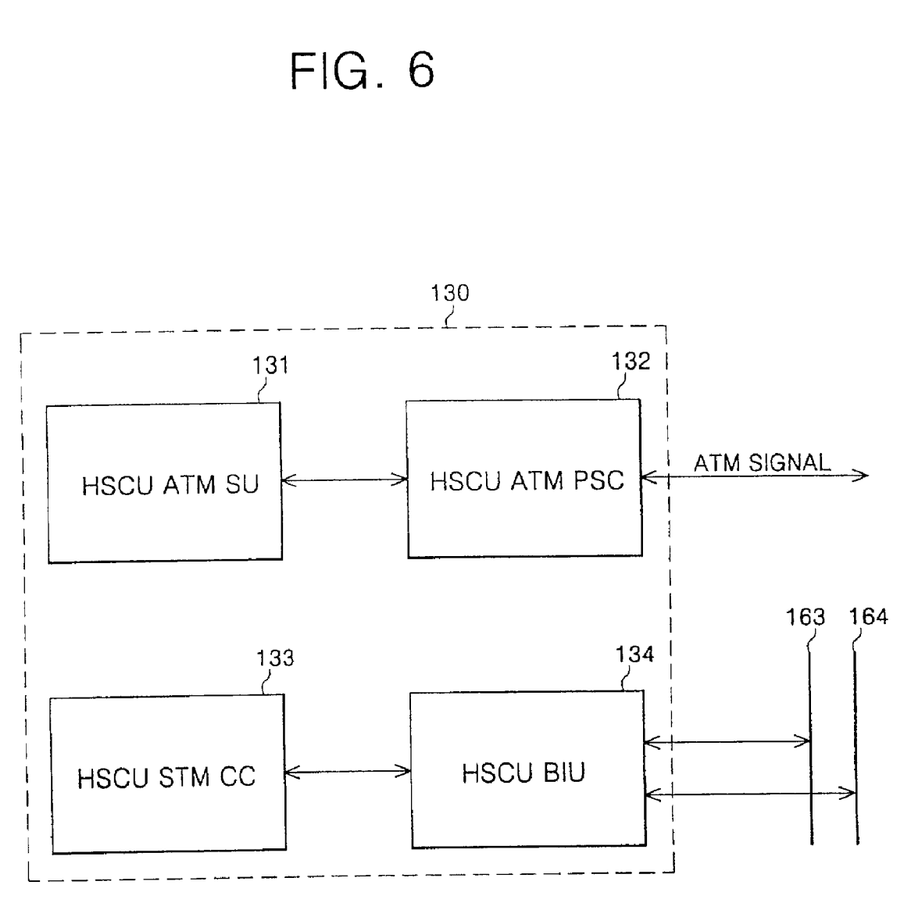
FIG. 6 is a block diagram illustrating a configuration of the host digital terminal switching/clock unit HSCU in FIG. 4.

FIG. 6 is a block diagram illustrating a configuration of the HSCU according to the preferred embodiment of the present invention.

As shown in FIG. 6, The HSCU 130 includes a parallel/serial converter HSCU PSC 132 and an ATM switching unit ATM SU 131 for exchanging an ATM signal, and a bus interface unit HSCU BIU 134 and an STM cross connector STM CC 133 for exchanging an STM signal. Therefore, The HSCU 130 exchanges the ATM and the STM signals among the above described units 101~150.

The HSCU PSC 132, including a parallel/serial converting chip capable of data transmission of 1.2 Gbps (gigabits per second), converts the ATM serial signal from the ANIU 110, the HNIU 140 or the HIU 150 to a parallel signal transmittable to the ATM switching unit 131, or vice versa.

The HSCU BIU 134, including a chip of a field-programmable gate array FPGA type, interfaces with the VC and the STM bus 163 and 164, and the STM cross connector 133.

The STM CC 133 performs cross connections of a grade of VC-11/-12, VC-3, or VC-4 to the STM dependent signal from the HSCU BIU 134, and transmits inversely the cross connected signal to the HSCU BIU 134.

The above mentioned configuration makes it possible to convert the ATM serial signal transmitted from each of the units 101~150 to a parallel signal at the HSCU PSC 132, to switch the parallel signal at the ATM SU 131, and to transmit inversely the switched signal to a corresponding unit through the HSCU PSC 132.

Additionally, the HSCU BIU 134 transmits the STM signal from the VC bus 163 and the STM bus 164 to the STM CC 133 so that the STM signal is cross-connected. Preferably, the STM signal is inversely transmitted to a corresponding unit through the VC bus 163 and the STM bus 164.

By mutual interactions each of the units 101~150 through the STM CC 133, and by the ATM signal transmissions through the ATM SU 131 and the HSCU PSC 132 capable of transmitting large amount of data, data corruption or unnecessary usages to the conventional common bus 14, can be prevented. Therefore, the HDT 100 according to the present invention can perform even more data transmissions than the conventional HDT.

Figure 7:
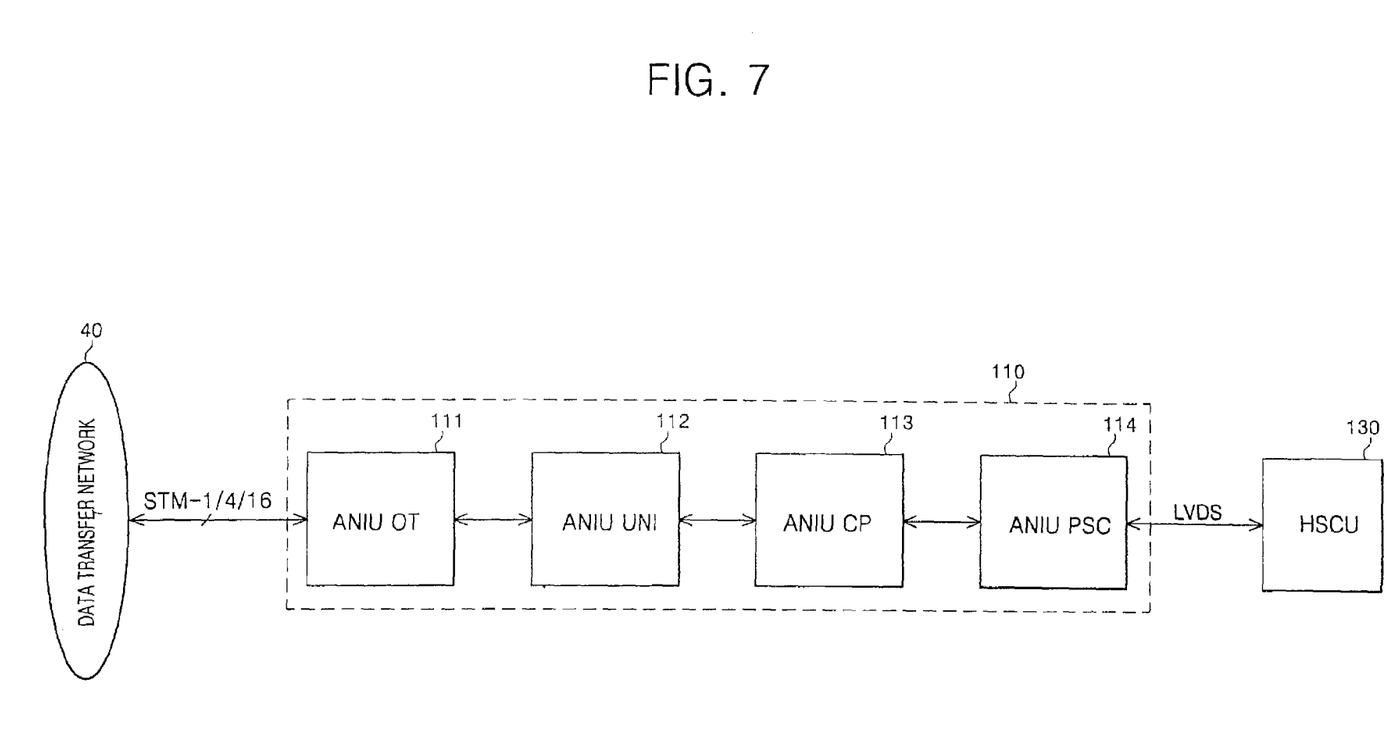
FIG. 7 is a block diagram illustrating a configuration of an asynchronous transfer mode ATM network-interface unit NIU in FIG. 4.

FIG. 7 is a block diagram illustrating a configuration of the ANIU according to the preferred embodiment of the present invention.

As shown in FIG. 7, the ANIU 110 includes an optical transmitter ANIU OT 111, a user network interface ANIU UNI 112, a cell processor ANIU CP 113, and a parallel/serial converter ANIU PSC 114.

The ANIU OT 111, including 4 ports connected to a data transfer network 40 through optical fiber cables, receives E1/T1, DS3, or STM-1/-4/-16 signal to perform optical/electronic interface, and transmits the interfaced signal to the ANIU UNI 112, or vice versa.

The ANIU UNI 112 has a role of an ATM interface for extracting the ATM cell data from the signal transmitted from the ANIU OT 111, and transmits the extracted signal to the ANIU CP 113, or vice versa.

The ANIU CP 113 performs an inverse-multiplex function to the ATM signal transmitted from the ANIU UNI 112, and each of the cell processes to the inverse-multiplexed ATM signal transmittable to the ANIU PSC 114, or vice versa.

In this case, the above described cell processors includes a real time OAM function for the ATM signal, a queuing and scheduling function for controlling the ATM traffics, and an ATM header converting function for VP/VC cross connections.

The ANIU PSC 114 converts the ATM signal transmitted from the ANIU CP 113 to an ATM serial signal, and transmits the serial ATM signal to the HSCU 130 in a method of a low voltage differential signaling LVDS, or vice versa.

Therefore, when a signal is transmitted from the data transfer network 40 to the ONU, the signal of an E1/T1, DS3 or STM-1/-4/-16 is converted into an ATM serial signal through the ANIU 110. Sequentially, the signal is transmitted to the HSCU 130, switched by the HSCU 130, and transmitted to the HNIU 140 or HIU 150 to be sent to a corresponding ONU 20.

Figure 8:
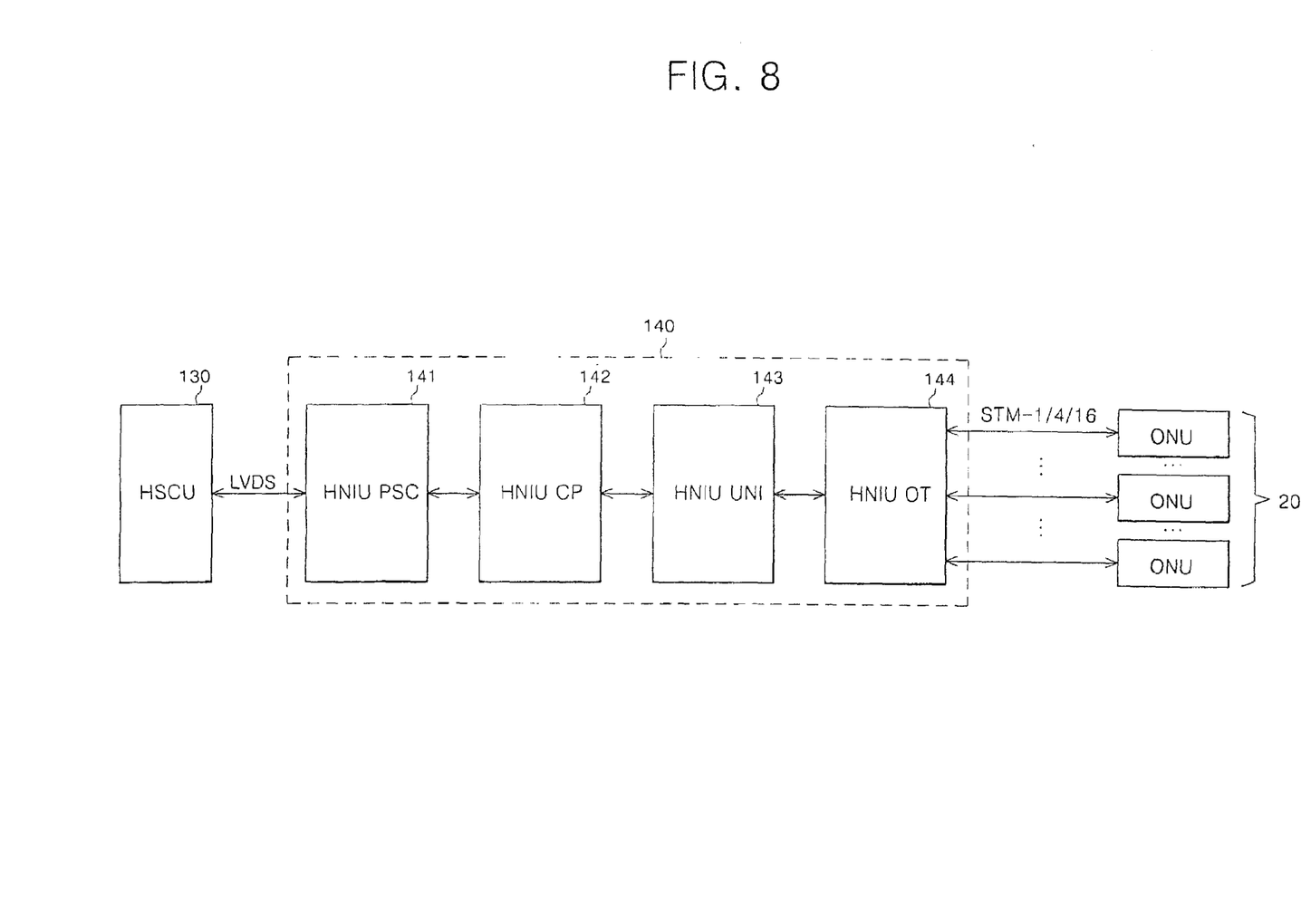
FIG. 8 is a block diagram illustrating a configuration of an HDT network-interface unit NIU in FIG. 4.

FIG. 8 is a block diagram illustrating a configuration of the HNIU according to the preferred embodiment of the present invention.

Referring to FIG. 8, the HNIU 140 includes a corresponding configuration to ANIU 110, such as a parallel/serial converter HNIU PSC 141, a cell processor HNIU CP 142, a HNIU UNI 143, and an optical transmitter HNIU OT 144.

The HNIU PSC 141 receives an ATM serial signal transmitted from the HSCU 130, performs parallel/serial conversion to the ATM signal, and transmits the ATM signal to the HNIU CP 142, or vice versa.

The HNIU CP 142 performs multiplexing function to the ATM signal transmitted from the HNIU PSC 141, performs each of the cell processes, and transmits the ATM signal to the HNIU UNI 143, or vice versa.

Obviously, each of the cell processes includes a real time OAM function for the ATM signal, a queuing and scheduling function for controlling the ATM traffics, and an ATM header converting function for VP/VC cross connections, or vice versa.

The HNIU UNI 143 converts the ATM signal transmitted from the cell processor 142 inversely, and transmits the ATM signal to the HNIU OT 144, or vice versa.

The HNIU OT 144 includes many ONU ports, where each of the ONU ports is respectively interfaced with each of the ONUs 20 through STM-1/-4/-16.

On the other hand, the HDT 100 can perform processes based on the STM, or on the STM/ATM hybrid.

Figure 9:
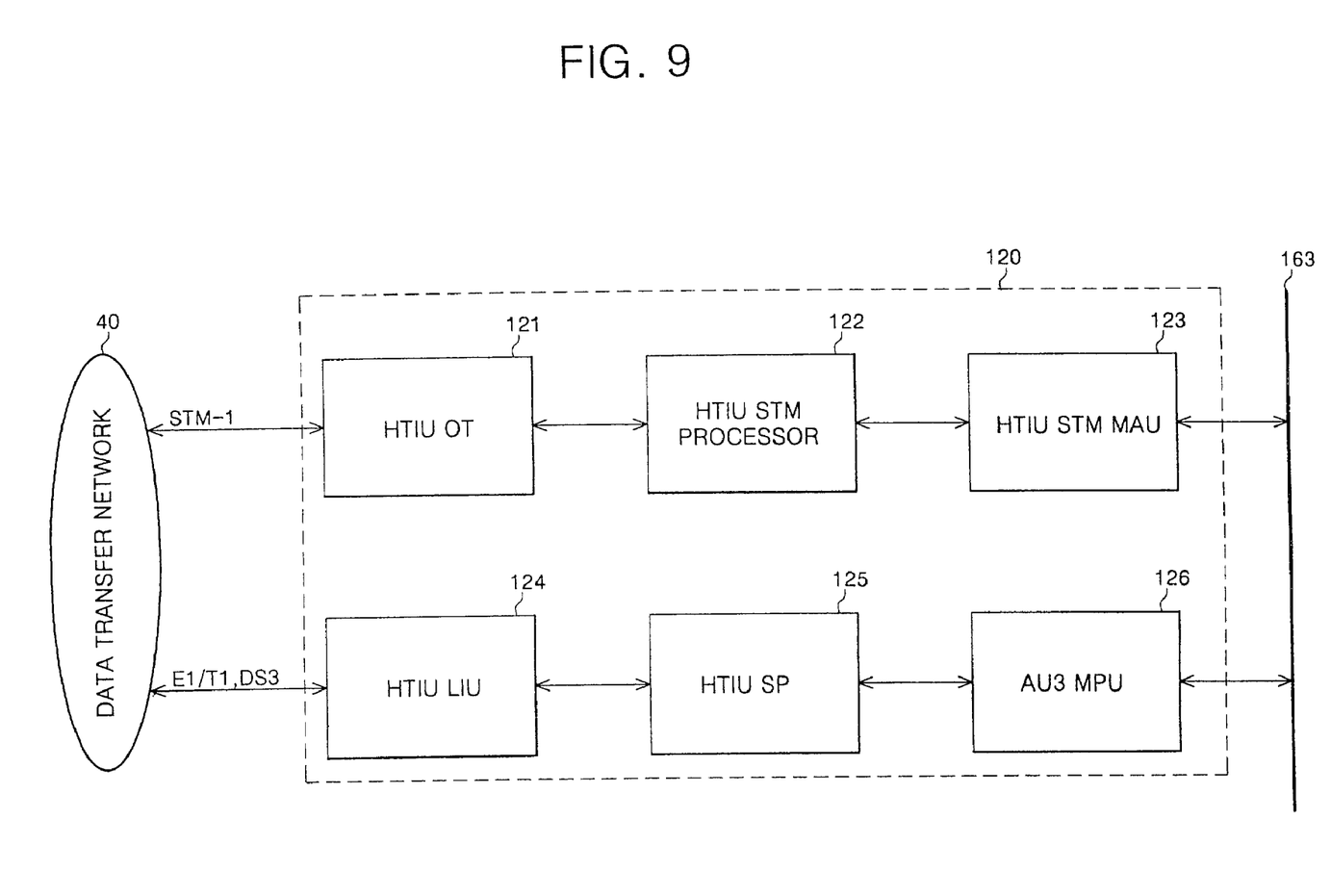
FIG. 9 is a block diagram illustrating a configuration of a HDT dependent interface unit in FIG. 4.

FIG. 9 is a block diagram illustrating a configuration of the HTIU according to the preferred embodiment of the present invention.

An optical/electronic interface is performed to the STM-1 optical signal transmitted from the data transfer network 40 through an optical transmitter HNIU OT 121, and the optical signal is transmitted to an STM processor 122.

The STM processor 122 performs an over-head and pointer processes to a signal from the HNIU OT 121, and transmits the signal to an STM mapping unit 123. The STM mapping unit 123 performs a mapping function to an STM-1 signal, and transmits the signal to the VC bus 163.

On the contrary, a line interface unit HTIU LIU 124 receives a signal, such as the E1, T1, or DS3 signal, from the network 40, and a signal processor HTIU SP 125 performs an over-head and pointer process to the signal.

Sequentially, the signal is multiplexed in an administration unit 3 AU3 multiplexing unit 126, and transmitted to the VC bus 163.

As described in the above statements, the STM-1 and the AU3 signal are respectively transmitted to the VC bus 163, and cross-connected to be sent to a corresponding unit according to an intrinsic transmission information of the signals.

On the contrary, the HTIU 120 performs a procedure for the signal transmitted from the ONU 29 to the data transfer network 40, where the procedure is an inverse procedure of the above described procedure. The HTIU 120 performs the procedure for the DS3 and the STM-1 signal separately.

Figure 10:
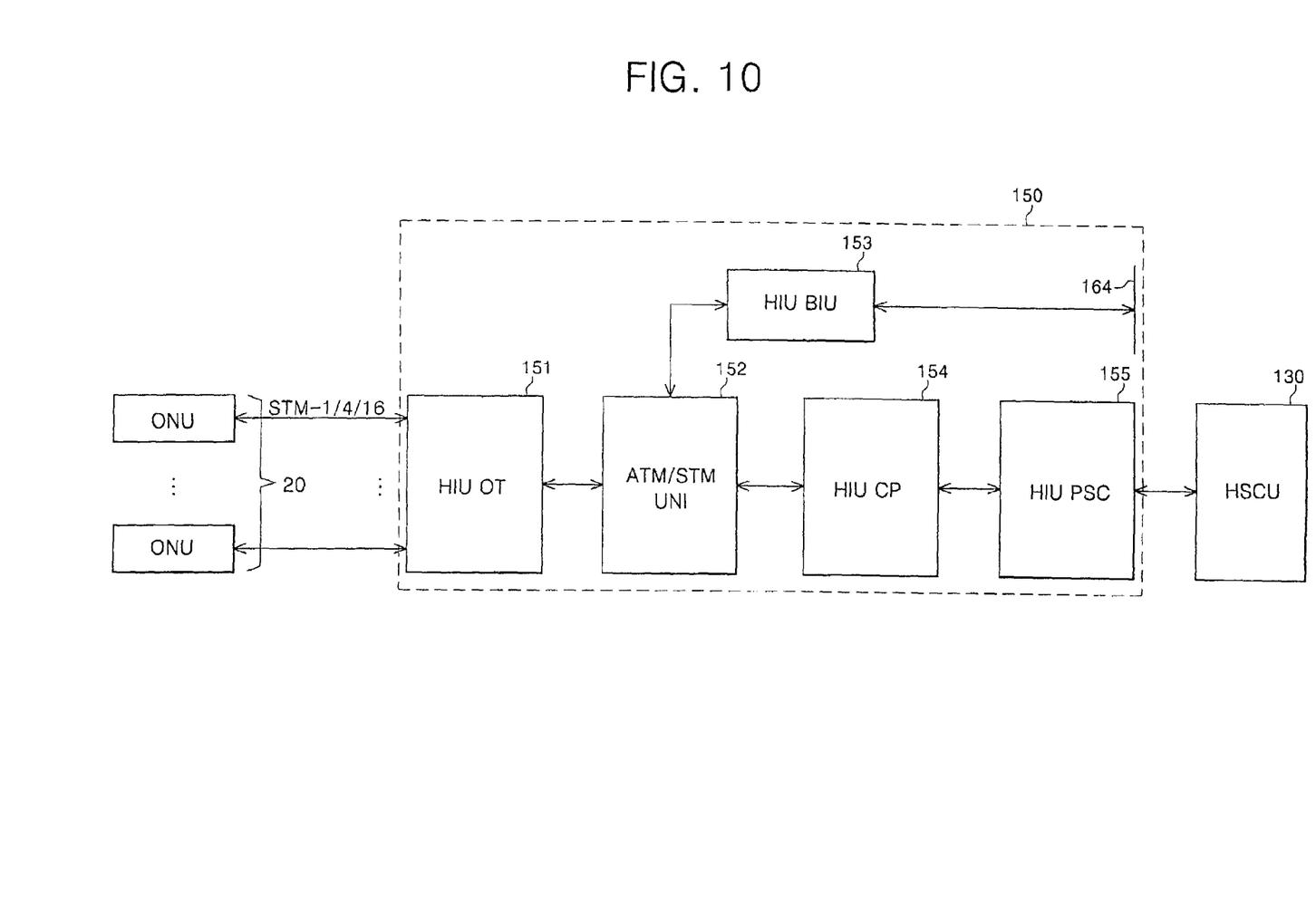
FIG. 10 is a block diagram illustrating a configuration of a hybrid interface unit HIU in FIG. 4.

FIG. 10 is a block diagram illustrating a configuration of the HIU according to the preferred embodiment of the present invention.

The HIU 150, as shown in FIG. 10, has a hybrid configuration, connected to the ONU 20, makes it possible to perform processes based on the STM and the ATM. The HIU 150 includes an optical transmitter HIU OT 151, an ATM/STM user network interface ATM/STM UNI 152, a bus interface unit HIU BIU 153, a cell processor HIU CP 154, and a parallel/serial converter HIU PSC 155.

The HIU OT 151, including many ONU ports, has a role of interface with many ONUs 20 through the STM-1/-4/-16 to perform an optical/electronic interface in both forward and backward direction.

An ATM/STM UNI 152, including a TADM04622 chip, performs an ATM and an STM interface in both directions.

In this case, the STM interface data separated by the ATM/STM UNI 152 is sent to an STM bus 164 through the bus interface 153, transmitted to the HSCU 130 to be cross-connected according to an STM transmission information, and output to the network 40 through the HTIU 120.

Additionally, the HIU CP 154 performs an inverse multiplexing and each of the cell processing to the ATM interface data separated by the ATM/STM UNI 152, in the same way of the transmission operations of the ANIU 10. Preferably, the data is converted into an ATM serial signal through the HIU PSC 155, and transmitted to the HSCU 130.

On the contrary, the HMCU 130 for controlling mutual interactions and data flows in each of the units 110~150, includes a central processing unit CPU. The CPU performs the entire controls to the common bus 160 and OAM header insertions to each of the units 110~150, while the CPU includes memory devices, connected to a network management system NMS (not shown), for storing all of the setting values of the HDT device 100.

As described in the above statements, the present invention provides an HDT performing mutual interactions to many units by the ATM cell switching or by the STM cross connections, while the units perform predetermined functions, such as ANIU, HNIU, HIU, and HTIU. Therefore, the HDT overcomes capacity limits according to mutual interactions among the units through the conventional common bus. Preferably, the HDT according to the present invention embodies a subscriber access network performing large amount of data transmissions, such as WAN, provides various services based on large amount of data, such as multimedia data, and increases the number of the connected subscribers more.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A host digital terminal (HDT) for performing backbone functions to a subscriber access network, while the network side of the host digital terminal is connected to a plurality of data transfer networks and the other side of the host digital terminal is connected to a plurality of optical network units (ONUs), said host digital terminal comprising:

a host digital terminal switching/clock unit (HSCU) for outputting an asynchronous transfer mode (ATM) signal, after an asynchronous transfer mode (ATM) serial signal is converted into an ATM parallel signal, an ATM switching is performed according to transmission information of the ATM parallel signal, and the ATM parallel signal is re-converted into the ATM serial signal, and for outputting a synchronous transfer mode (STM) signal, after the STM dependent signal is received, and a virtual channel (VC) cross connection is performed;

an ATM network interface unit (ANIU), connected to the data transfer network, for receiving a signal transmitted from the data transfer network, extracting an ATM signal from the transmitted signal, performing an inverse-multiplexing and each of ANIU cell processes to the extracted ATM signal, converting the extracted ATM signal to the ATM serial signal, and transmitting the ATM serial signal to the HSCU, sequentially;

a host digital terminal metwork interface unit (HNIU), connected to plurality of optical network units (ONUs), for converting the ATM serial signal transmitted from the host digital terminal switching/clock unit (HSCU) to the ATM parallel signal, performing a multiplexing and each of host digital terminal cell processes to the ATM parallel signal, transmitting the ATM parallel signal to the connected ONUs, sequentially;

a host digital terminal main control unit (HMCU) for performing control management functions for controlling mutual interactions among the units of the host digital terminal and data flows; and a shelf comprising a common bus to exchange all of data among the units, each one of the units being plugged in the shelf;

the common bus including:

an operation, administration and maintenance (OAM) data bus for exchanging an OAM data;

a clock bus for transmitting a clock impression signal;

a virtual channel (VC) bus for exchanging a VC signal; and a synchronous transfer mode STM bus for exchanging an STM signal.

2. The host digital terminal according to claim 1, wherein the ATM network interface unit (ANIU) interfaces with the data transfer network through at least one of E1/T1, DS3, STM-1, STM-4, and STM-16.

3. The host digital terminal according to claim 1, wherein the data transfer network is an ATM network interacted with at least one of a public switched telephone network (PSTN), a voice over internet protocol service network (VoIP), and an Internet protocol service network (IP).

4. The host digital terminal according to claim 1, wherein the HNIU interfaces with a plurality of ONUs through at least one of STM-1, STM-4 sand STM-16.

5. The host digital terminal according to claim 1, wherein a topology connected to the ONU is a star topology.

6. The host digital terminal according to claim 5, wherein the star topology is an ATM passive optical network (PON).

7. The host digital terminal according to claim 1, wherein the shelf comprises 21 slots, while two HMCUs and two HSCUs are installed for duplication functions, and the other units are installed in variable according to the service conditions.

8. The host digital terminal according to claim 1, wherein the HSCU comprises:
a parallel/serial converter (HSCU PSC) for converting the transmitted ATM serial signal to an ATM parallel signal, or vice versa;
an ATM switching unit (HSCU SU), a switching fabric, for switching the ATM signal converted by the HSCU PSC according to the transmission information of the ATM signal, and for transmitting inversely the ATM signal to the HSCU PSC;
a bus interface unit (HSCU BIU) for receiving a STM dependent signal from the VC bus and the STM bus, for performing a bus interface, or vice versa; and
an STM cross connecter (STM CC) for performing a cross connection to the STM dependent signal transmitted from the HSCU BIU among one of the VC-11, VC-12, VC-3 or VC-4 class, and for transmitting inversely the STM signal to the HSCU BIU.

9. The host digital terminal according to claim 1, wherein the ANIU comprises:
an optical transmitter (ANIU OT), comprising a plurality of ports connected to the data transfer network through optical fiber cables, for receiving a signal from the data transfer network to perform an optical/electronic interface, or vice versa;
a user network interface (UNI) for receiving the optical/electronic interfaced signal from the ANIU OT to perform an ATM interface to extract an ATM signal, or vice versa;
a cell processor (ANIU CP) for performing an inverse multiplexing to the extracted ATM signal to do each kind of ATM cell processes, or vice versa; and
a parallel/serial converter (ANIU PSC) for converting the cell processed ATM signal to an ATM serial signal transmittable to the HSCU, or vice versa.

10. The host digital terminal according to claim 1, wherein the HNIU comprises:
a parallel/serial converter (HNIU PSC) for converting the ATM serial signal transmitted from the HSCU to an ATM parallel signal, or vice versa;
a cell processor (HNIU CP) for performing multiplexing and each kind of cell processes to the ATM parallel signal transmitted from the HNIU PSC;
a universal network interface (HNIU UNI) for re-converting the ATM signal from the HNIU CP to a signal transmittable to the data transfer network, or vice versa; and
an optical transmitter (HNIU OT), connected to a plurality of optical network units (ONUs) through optical fiber cables, for performing an optical/electronic interface to the signal from the HNIU UNI to be transmitted to the ONU, or vice versa.

11. The host digital terminal according to claim 1, further comprising a host digital terminal tributary interface unit (HTIU) for performing:
an over head and pointer processes to an STM-1 signal transmitted from the data transfer network, and the STM-1 signal transmission to the common bus, or vice versa; and
a line interface, and an over head and pointer process to a signal, transmitted from said data transfer network, and the signal transmission to the common bus through multiplexing in an administration unit, or vice versa, the line interface being any one of E1, T1, and DS3.

12. The host digital terminal according to claim 11, wherein the host digital terminal tributary interface unit (HTIU) comprises:
an optical transmitter HTIU OT for receiving an STM-1 signal transmitted from the data transfer network to perform optical/electronic interface, or vice versa;
an STM processor for performing an over head and a pointer process to the interfaced signal from the HTIU OT, or vice versa;
an STM mapping unit (STM MAU) for converting the processed signal from the STM processor to an STM-1 signal to be transmitted to the common bus, or vice versa;
a line interface unit (HTIU LIU) for receiving at least one signal among E1, T1, and DS3, or vice versa;
a signal processor HTIU SP for performing an over head and a pointer process to the interfaced signal at HTIU LIU, or vice versa; and
an AU3 multiplexing unit AU3 MPU for multiplexing the processed signal in the signal processor to an AU3 signal to be transmitted to the common bus, or vice versa.

13. The host digital terminal according to claim 1, further comprising:
a hybrid interface unit (HIU), connected to a plurality of ONUs, for transmitting the ATM signal from the HSCU and the STM signal from the common bus to the ONU.

14. The host digital terminal according to claim 1, wherein the hybrid interface unit HIU comprises:
a parallel/serial converter (HIU PSC) for converting the ATM serial signal transmitted from the HSCU to an ATM parallel signal, or vice versa;
a cell processor (HIU CP) for performing a multiplexing and cell processes to the ATM signal converted by the HIU PSC, or vice versa;
a bus interface unit (HIU BIU) for performing a bus interface to an STM signal transmitted from the common bus, or vice versa;
an ATM/STM user network interface (ATM/STM UNI) for interfacing the ATM signal processed by the HIU CP and the STM signal through the HIU BIU, or vice versa; and
an optical transmitter (HIU OT) for performing optical/electronic interface to the signal interfaced by the ATM/STM UNI, accommodating the signal being transmitted to the data transfer network, or vice versa.

15. A method of a host digital terminal, comprising:
outputting an asynchronous transfer mode signal, after an asynchronous transfer mode serial signal is converted into an asynchronous transfer mode parallel signal, an asynchronous transfer mode switching is performed according to transmission information of the asynchronous transfer mode parallel signal, and the asynchronous transfer mode parallel signal is re-converted into the asynchronous transfer mode serial signal, and for outputting a synchronous transfer mode signal, after the synchronous transfer mode dependent signal is received, and a virtual channel cross connection is performed;
receiving a signal transmitted from the data transfer network, extracting an asynchronous transfer mode signal from the transmitted signal, performing an inverse-multiplexing and each of cell processes to the extracted asynchronous transfer mode signal, converting the extracted asynchronous transfer mode signal to the asynchronous transfer mode serial signal, and transmitting the asynchronous transfer mode serial signal, sequentially;
converting the asynchronous transfer mode serial signal transmitted to the asynchronous transfer mode parallel signal, performing a multiplexing and each of host digital terminal cell processes to the asynchronous transfer mode parallel signal, transmitting the asynchronous transfer mode parallel signal to connected optical network units, sequentially;

performing control management functions for controlling mutual interactions of the host digital terminal and data flows; and exchanging all data in a common bus;

the common bus comprising:
- an operation, administration and maintenance (OAM) data bus for exchanging an OAM data;
- a clock bus for transmitting a clock impression signal;
- a virtual channel (VC) bus for exchanging a VC signal; and
- a synchronous transfer mode STM bus for exchanging an STM signal.

16. The method of claim 15, said step of outputting an asynchronous transfer mode signal, further comprising:

converting the transmitted asynchronous transfer mode serial signal to an asynchronous transfer mode parallel signal, or vice versa;

switching the asynchronous transfer mode signal converted by said step of converting the transmitted asynchronous transfer mode serial signal according to the transmission information of the asynchronous transfer mode signal, and for transmitting inversely the asynchronous transfer mode signal to said step of converting the transmitted asynchronous transfer mode serial signal;

receiving a synchronous transfer mode dependent signal from the virtual channel bus and the synchronous transfer mode bus, for performing a bus interface, and vice versa; and performing a cross connection to the synchronous transfer mode dependent signal transmitted from said step of receiving a synchronous transfer mode dependent signal among one of the virtual channel-11, virtual channel-12, virtual channel-3 or virtual channel-4 class, and transmitting inversely the synchronous transfer mode signal to said step of receiving a synchronous transfer mode dependent signal.

* * * * *